(12) United States Patent
Faris

(10) Patent No.: US 7,083,851 B2
(45) Date of Patent: Aug. 1, 2006

(54) HIGH REFRACTIVE INDEX LAYERS

(75) Inventor: Tom Faris, Pataskala, OH (US)

(73) Assignee: Vampire Optical Coatings, Inc., Kirkersville, OH (US)

( * ) Notice: Subject to any disclaimer, the term of this patent is extended or adjusted under 35 U.S.C. 154(b) by 0 days.

(21) Appl. No.: 10/898,763

(22) Filed: Jul. 26, 2004

(65) Prior Publication Data

US 2005/0025976 A1 Feb. 3, 2005

Related U.S. Application Data

(60) Provisional application No. 60/490,658, filed on Jul. 28, 2003.

(51) Int. Cl.
*B32B 27/00* (2006.01)
*C08K 3/22* (2006.01)

(52) U.S. Cl. ............... 428/323; 428/328; 428/330; 428/331; 428/473.5; 524/430; 524/606

(58) Field of Classification Search ............ 428/411.1, 428/412, 480, 522, 323, 328, 330
See application file for complete search history.

(56) References Cited

U.S. PATENT DOCUMENTS

| | | | |
|---|---|---|---|
| 4,798,773 A | 1/1989 | Yasukawa et al. | 429/313 |
| 4,855,199 A | 8/1989 | Bolon et al. | 430/18 |
| 5,202,412 A * | 4/1993 | Auman et al. | 528/353 |
| 5,336,925 A | 8/1994 | Moss et al. | |
| 5,344,916 A | 9/1994 | Harris et al. | 528/353 |
| 5,494,949 A | 2/1996 | Kinkel et al. | 523/212 |
| 5,536,584 A * | 7/1996 | Sotokawa et al. | 428/458 |
| 5,536,792 A | 7/1996 | Hogan et al. | 525/432 |
| 5,856,018 A | 1/1999 | Chen et al. | 428/448 |
| 5,925,438 A | 7/1999 | Ota et al. | 428/141 |
| 5,969,088 A | 10/1999 | Ezzell et al. | 528/353 |
| 5,991,081 A | 11/1999 | Haaland et al. | 359/589 |
| 6,245,428 B1 | 6/2001 | Port et al. | 428/421 |
| 6,251,562 B1 | 6/2001 | Breyta et al. | 430/287.1 |
| 6,329,058 B1 | 12/2001 | Arney et al. | 428/403 |
| 6,389,215 B1 | 5/2002 | Lindsay et al. | 385/145 |
| 6,586,561 B1 | 7/2003 | Litt et al. | 528/353 |
| 6,693,746 B1 * | 2/2004 | Nakamura et al. | 359/580 |
| 6,746,730 B1 | 6/2004 | Tanioka et al. | 428/1.1 |
| 6,756,089 B1 | 6/2004 | Yoneya et al. | 428/1.26 |
| 2002/0119304 A1 | 8/2002 | Arney et al. | 428/328 |

FOREIGN PATENT DOCUMENTS

| | | | |
|---|---|---|---|
| JP | 11012465 A | * | 1/1999 |
| JP | 2001348477 A | * | 12/2001 |

* cited by examiner

*Primary Examiner*—Monique R. Jackson
(74) *Attorney, Agent, or Firm*—Tarolli, Sundheim, Covell & Tummino LLP

(57) ABSTRACT

A composition for forming a layer on a substrate includes a polyelectrolyte that is soluble in a polar solvent. The polyelectrolyte includes a plurality of aromatic groups and nitrogen atoms in a main polymer chain and has a refractive index of at least about 1.64 at a wavelength of about 680 nm. The composition also includes a solvent and, optionally, a plurality of colloidal particles.

22 Claims, 2 Drawing Sheets

HIGH REFRACTIVE INDEX LAYERS

RELATED APPLICATION

This application claims the benefit of U.S. Provisional Application No. 60/490,658, which was filed on Jul. 28, 2003 and is incorporated hereby reference, in its entirety.

FIELD OF THE INVENTION

The present invention relates to a high-refractive index layer and more particularly to a high refractive index layer that is used in an anti-reflective coating or film.

BACKGROUND OF THE INVENTION

Transparent glass or plastic substrates (e.g., optical substrates) can experience a substantial loss of optical performance due to unwanted reflections from an air-substrate interface. When multiple interfaces are present within a display, the loss of viewing efficiency can be large. The losses from the air-substrate interface can be described by the Fresnel equation:

$$((n_d-1)/(n_d+1))^2 * 100 = \%\ \text{reflection}$$

In this equation $n_d$ represents the refractive index of the optical substrate and 1 represents the approximate refractive index of air.

This loss of optical performance becomes apparent when one tries to view an image or text through a transparent glass or plastic substrate. In conditions of high ambient lighting, the surface reflection becomes so intense that one cannot readily view the text or the images through the transparent substrate.

Various solutions to this problem have been disclosed in the prior art. The most common of these is to coat the transparent substrate with a layer of material, which has a refractive index lower than that of the substrate and that has an optical thickness of approximately one-quarter the wavelength of the light of interest. For instance, by coating a poly(ethylene terephtalate) (PET) film with a single layer (e.g., about 0.100 microns thickness) of gas phase deposited $SiO_2$, the percent reflectance can be decreased from about 5.75 percent per side to about 1.50 percent per side, with concomitant improvements in viewing efficiency. As the number of functional layers increases, the efficiency of these coatings also improves dramatically, that is, these coatings go from being quite narrow in their performance characteristics to quite broad, as one goes from 2-layers to greater than 3-layers in an optical stack.

U.S. Pat. No. 6,245,428 assigned to CPFilms, Inc., discloses an anti-reflective coating that utilizes in a low refractive index fluorine-containing polymer in conjunction with a high refractive index organic-inorganic composite. The high refractive index organic-inorganic composite comprises a titanium (IV) ester reacted with organo-silicone compounds to produce a ceramer composition that exhibits high stability in conjunction with a relatively high refractive index. The ceramer is combined with inorganic oxides, such as iron oxide, and is capable of producing a refractive index of about 1.60 by dispersion of the oxide particles in the ceramer composition.

U.S. patent application Ser. No. 20020119304 assigned to 3M Innovative Properties discloses a process for manufacturing high refractive index colloidal oxide particles for modification of a polymer's properties. Also disclosed are anti-reflective coatings manufactured using these particles as a means to modify the properties of the resulting high refractive index layer. The refractive index for a polymer organic matrix with and without colloidal oxide modification were, respectively, 1.65 and 1.46. As a result of the relatively low refractive index of the organic matrix, very high levels of colloidal oxide must be used to obtain layers that have refractive indices high enough to be useful in anti-reflective coatings.

The invention disclosed in this application and in U.S. Pat. No. 6,245,428 suffer from these constraints due to limited availability of UV curable monomers in the proper refractive index range. Choices of available UV curable monomers are limited to a refractive index range between 1.48 and 1.56. These ranges are less than optimal, as the refractive index of a blend is approximately the weighted volume percent averages of the respective refractive indices of the component materials. Thus, if the UV curable matrix starts with a lower refractive index, then the valuable properties of the high refractive index particles are unnecessarily reduced by the addition of the UV curable matrix. In addition, it is also difficult, in practice, to prepare coatings that contain enough high index nano-particles to overcome this specific limitation.

U.S. Pat. No. 5,991,081 assigned to Peter D. Haaland, discloses the preparation of anti-reflective coated lenses by the evaporation of fluoropolymers in a vacuum. Due to use of a vacuum, the size of the substrate that can coated is limited by sizes of available vacuum chambers. Additionally, as the size of the vacuum chamber increases, the costs, the cycle time and the loss of economic efficiency also increase.

U.S. Pat. No. 5,925,438 assigned to DaiNippon Printing Company, teaches using sol-gel chemistry to produce an alternating stack of high and low refractive index layers. The low refractive index layer is prepared by hydrolysis of trialkoxymethylsilanes. The high refractive index layer is prepared via hydrolysis of titanium (IV) esters to form an organo-titanium compound.

U.S. Pat. No. 5,856,018 teaches a dip coating process for manufacturing anti-reflective coated sheets. Particular coating compositions used in this process are comprise starting monomers, such as titanium (IV) esters and tetraethyl ortho silicates. Using these monomers, anti-reflective coatings are prepared with less than 0.30 percent reflectance per side, high durability and broadband performance.

Asahi Glass and DuPont (DuPont Company literature: Teflon® AF brochure and Asahi Glass Company technical information bulletin: Amorphous fluoropolymers Cytop®) have developed commercially available fluorinated polymers with very low refractive indices that are used to prepare coated films and articles that exhibit very low surface reflectance. These polymers exhibit the lowest refractive indices of any known polymers and thus can be used to prepare very simple yet effective coatings that have virtually no reflection across the visible spectrum. A specific limitation of these polymers is that they are extremely expensive and are only soluble in highly fluorinated solvents, which contributes to the expense of the resulting anti-reflective films.

SUMMARY OF THE INVENTION

The present invention relates to a composition for forming a layer on a substrate. The composition comprises a polyelectrolyte that is soluble in a polar solvent and a solvent that facilitates solvation of the polymer. The polyelectrolyte includes a plurality of aromatic groups and nitrogen atoms in a main polymer chain and has a refractive index of at least about 1.64 at a wavelength of about 680 nm.

In an aspect of the invention, the polyelectrolyte includes at least one of a polyamic acid, a polyamic acid ester or a polyamic acid salt. The polyamic acid, polyamic acid ester, or polyamic acid salt can be at least partially condensed to form imide rings within a main chain of the polyamic acid, polyamic acid ester, or polyamic acid salt.

In another aspect of the invention, the composition can further comprise a plurality of uniformly dispersed colloidal particles. The colloidal particles can include at least one of a colloidal metal oxide or colloidal inorganic oxide selected from the group consisting of silicon oxides, aluminum oxides, titanium oxides, zinc oxides, germanium oxides, indium oxides, tin oxides, zirconium oxides, and antimony oxides. The colloidal particles can have an average particle diameter less than about 100 nm and can comprise about 40 weight percent to 80 weight percent of the composition's solids.

A further aspect of the invention relates to an antireflective coating that comprises a high-refractive index layer having a refractive index of at least about 1.70 at a wavelength of about 680 nm. The high-refractive index layer includes a polyelectrolyte having a refractive index of at least about 1.64 at a wavelength of about 680 nm and a plurality of uniformly dispersed colloidal particles having an average particle diameter less than about 100 nm. The polyelectrolyte in the high-refractive index layer can comprise at least one of a polyamic acid, polyamic acid ester, or polyamic acid salt that has been at least partially cured to form imide rings within a main chain of the polyelectrolyte. The coating can also include a low-refractive index layer that has a refractive index less than about 1.64 at a wavelength of about 680 nm. The high-refractive index layer can be provided over a transparent substrate, and the low-refractive index layer can be provided over the high refractive index layer so that the high-refractive index layer is at least partially interdisposed between the low-refractive index layer and the substrate.

BRIEF DESCRIPTION OF THE DRAWINGS

Further features of the present invention will become apparent to those skilled in the art to which the present invention relates from reading the following description of the invention with reference to the accompanying drawings in which.

DETAILED DESCRIPTION

Figure 1:
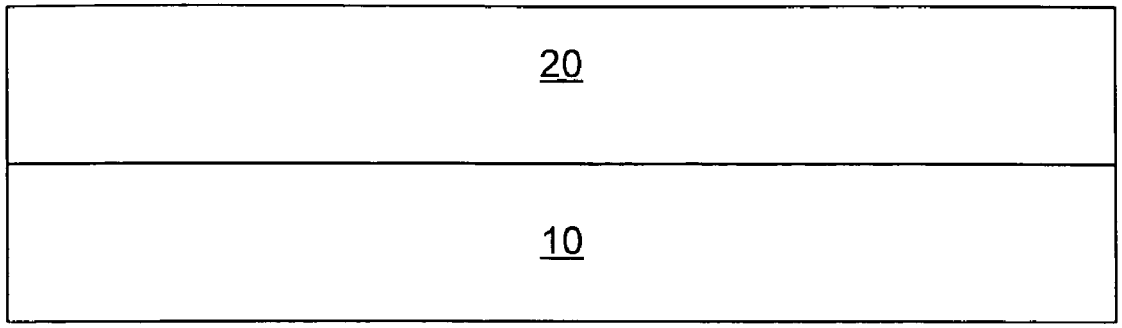
FIG. 1 illustrates a schematic cross-sectional view of a high refractive index layer formed on a substrate in accordance with an aspect of the invention.

The present invention relates to a composition that can be used to form a polymeric layer. The polymeric layer can be used as a high-refractive index layer for a anti-reflective coating or film. By "high-refractive index layer" it is meant a polymeric layer that has a refractive index of at least about 1.70 at a wavelength of 680 nm. An anti-reflective coating with a high-refractive index layer in accordance with the invention is capable of imparting excellent anti-reflective properties to the surfaces of films, sheets, and/or substrates, such as those used on various types of displays (e.g., cellular telephone lenses, personal digital assistants, flat panel displays, laptop computer modules, and large area televisions), eyeglasses, semiconductor devices, or other applications where there is a need to reduce or eliminate undesired reflections from a surface. The films, sheets, and/or substrates can be at least partially transparent or at least partially opaque depending on the desired use.

In one aspect of the invention, the composition includes a polyelectrolyte with a main polymer chain that comprises aromatic groups and nitrogen atoms (e.g., amide groups or amine groups) as well as multiple ionizable radicals in the main polymer chain of the polyelectrolyte. The number of aromatic groups and nitrogen atoms provided in the main polymer chain is such that the polyelectrolyte has an inherently high refractive index of at least about 1.64 at a wavelength of about 680 nm. The inherently high refractive index of the polyelectrolyte can also be provided by the inclusion of bromine, sulfur, and/or fluorine in the polyelectrolyte. The aromatic groups, nitrogen, bromine, sulfur, and/or fluorine can be included in monomers that are polymerized to form repeating units of the polyelectrolytes. Preferred monomers are those that include aromatic moieties that are arranged in a coplanar manner in the main polymer chain upon formation of the polyelectrolyte.

Examples of polyelectrolytes that can be used in accordance with the present invention can include polyamic acids and/or polyamic acid derivatives, such as polyamic acid esters and polyamic acid salts, which are soluble in polar solvents, and particularly polar aprotic solvents. The polyamic acid, polyamic acid ester, and/or polyamic acid salt can comprise repeating units that include aromatic groups, amide groups, and/or carboxylic acid groups and that have an inherently high refractive index that is greater than about 1.64 at a wavelength of about 680 nm. This inherently high refractive index allows the polyamic acid, polyamic acid ester, and/or polyamic acid salt to form upon partial condensation a polyimide that has a refractive index of at least about 1.68 at a wavelength about 680 nm, preferably a refractive index greater that about 1.70 at a wavelenght of about 680 nm.

By way of example, the polyamic acid, polyamic acid ester, and/or polyamic acid salt can be formed by reacting diamine monomers and dianhydride monomers. The diamine monomers and dianhydride monomers can include aromatic groups, nitrogen, bromine, sulfur, and/or fluorine. Examples of diamines that can be used to form the polyamic acid, polyamic acid ester, and/or polamic acid salt include p-phenylene diamine, m-phenylene diamine, 3,3'-bis (trifluoromethylbenzidine), 2,2'-bis (trifluoromethylbenzidine), o-tolidine, 4,4'-diamino 2,2'-dichlorodimethyl biphenyl, 4,4'-oxydianiline, o-tolidine sulfone, 4,4' diaminodiphenyl sulfide, and combinations thereof. Examples of dianhydrides that can be used to form the polyamic acid, polyamic acid ester, and/or polamic acid salt include 3,3',-4,4'-benzophenone tetracarboxylic dianhydride, pyromellitic dianhydride, 3,3'4,4' biphenyltetracarboxylic dianhydride, 2,2'-bis-(3,4 dicarboxyphenyl)hexafluoropropane dianhydride, 4,4' oxydiphthalic anhydride, DSDA, 4,4' bisphenol A dianhydride, and hydroquinone diphthalic anhydride.

It will be appreciated by one skilled in the art that other diamines and/or dianhydrides can be used to form the polyamic acid, polyamic acid ester, and/or polyamic acid salt in accordance with the present invention. Examples of such diamines and/or dianhydrides can be selected from the diamines and dianhydrides disclosed in U.S. Pat. No. 5,344,916, herein incorporated by reference in its entirety. Moreover, it will be appreciated that other compounds besides diamines and dianhydrides can be used to form the polyamic acids, polyamic acid esters, and polyamic acid salts in accordance with the present invention. These other compounds can include, for example, other amines, anhydrides, and carboxylic acids.

The composition in accordance with the present invention also includes a solvent that facilitates solvation of the polyelectrolyte. Examples of solvents that facilitate solvation of the polyelectrolyte include organic polar aprotic solvents, such as dimethyl formamide, dimethyl acetamide, ketones (e.g., cyclohexanone and methyl ethyl ketone), and blends thereof (e.g., a blend of dimethyl formamide and cyclohexanone). The solvent can be mixed with the monomers to facilate solution polymerizaton of the monomers and/or mixed with the polyelectrolyte after polymerization of the monomers to form the polyelectrolyte.

Optionally, the composition can further include a plurality of uniformly dispersed colloidal particles, such as colloidal conductive oxide particles, colloidal infrared radiation absorbing or reflecting particles, and/or collodial high refractive index particles, that are capable modifying the physical properties of the high-refractive index layer that is formed from the composition. These colloidal particles have an average particle size between about 1 nm and 1 micron, and preferably have an average particle size less than about 100 nm. A composition in accordance with the present invention comprising the colloidal particles is capable of forming a composite polymeric layer (i.e., ceramer) or a composite high refractive index layer.

In an aspect of the invention, the colloidal particles can include nano-sized colloidal oxide particles. The colloidal oxide particles can be used to modify (i.e., increase or decrease) the refractive index of the high-refractive index layer that is formed from the composition as well as modify other properties, such as infrared absorption and light transmissivity. The colloidal oxide particles when provided in the composition are readily coated by the polyelectrolyte and readily dispersed by the solvent. The polyelectrolyte coating advantageoulsy provides a uniform surface charge on the colloidal particles that prevents the colloidal particles from aggregating and forming larger light scattering agglomerates, which can reduce the anti-reflective, and light transmission properties of the high-refractive index layer formed from the composition.

Additionally, as result of the compatability of the polyelectrolytes and with the colloidal oxide, it is possible to vary the refractive index of the resulting composite refractive index layer with very fine precision. This allows one skilled in the art to manufacture coating layers that have refractive indices, which are tuned for a particular application.

The colloidal oxide particles can include inorganic oxides and/or metal oxides, such as silicon oxides, aluminum oxides, titanium oxides, zinc oxides, germanium oxides, indium oxides, tin oxides, zirconium oxides, antimony oxides and/or combinations thereof. The colloidal oxide can be provided in the composition in the form of colloidal oxide sol. In a colloidal oxide sol, the colloidal oxide particles are blended with an alcohol, such as methanol, isopropanol, or n-propyl alcohol. Preferred colloidal oxide sols include a stannic oxide sol, zirconium oxide sol, and antimony oxides sol, such as is commercially available from Nissan Chemical America under the trade names SunColloid® Hx-305M1, SunColloid® HIT-301M1 and SunColloid® Hx-300M1; stannic oxide sol, titanium oxide sol, and zirconium oxide sol, such as is commercially available from Nissan Chemical America under the trade name SunColloid® HIT-32M and HIT-30M; antimony pentoxide sol, such as is commercially available from Nissan Chemical America under the trade name SunColloid® AMT-130S and SunColloid® AMT-330; and zinc oxide and antimony oxide, such as is commercially available from Nissan Chemical America under the trade name Celnax®.

The amount of colloidal oxide that is provided in the composition can be between about 5.0 weight percent and about 95.0 weight percent based on the solids of the composition. Preferably, the amount of colloidal oxide that is provided in the composition can be between about 25.0 weight percent and about 85.0 weight percent on a solids basis, and, more preferably, between about 40 weight percent and about 80 weight percent on a solids basis.

It will be appreciated by one skilled in the art the composition used to form the high refractive index layer can include other additives. An example of such an additive includes a flow control additive (e.g., fluoro surfactant) to promote processing and leveling.

FIG. 1 illustrates that the composition including the polyelectrolyte, the solvent, and optionally the colloidal particles or other additives can be provided on a substrate 10, such as a transparent film (e.g., triacetylcellulose, poly (ethylene)terepthalate, polycarbonate, and PMMA resins), in the form of a uniform layer 20 by typical polymeric processing techniques. Examples of such techniques include gravure coating, dip coating, or spin coating. A preferred technique is a gravure coating technique, which employs employs a reverse, kiss gravure coating method, such as a MicroGravure® coating technology, Once applied to the substrate 10, the uniform layer 20 of the composition can be dried, for example, by evaporation of the solvent at room temperature (e.g., about 25° C.) or an elevated temperature (e.g., about 100° C.). Evaporation of the solvent forms a high-refractive index layer 20 on the substrate 10. The high refractive index layer can comprise a polymeric layer (e.g., polyamic acid layer), where colloidal particles are omitted from the composition, or ceramer (e.g., polyamic acid/colloidal oxide composite), where colloidal particles are added to the composition. The high refractive index layer can be efficiently cured by, for example, thermal or chemical imidization to leave behind an insoluble, high glass transition temperature, chemical resistant, and high refractive index layer.

The cured high-refractive index layer 20 can exhibit a refractive index of a least about 1.700 at a wavelength of about 680 nm, without any modification via inclusion of colloidal oxide, and exhibit a refractive index greater than 1.750 with the inclusion of the colloidal oxide but not less than 1.68 depending on the intended end use. The cured high-refractive index layer 20 can have can also selectively absorb infrared radiation, selectively transmit visible light, and exhibit very low surface resistivity. Additionally, the high-refractive index layer 20 can have a thickness of about 5 nm to about 200 nm. It will be appreciated, however, that the thickness of the high-refractive index layer can be greater or less than this thickness depending on the desired use of the layer.

Figure 2:
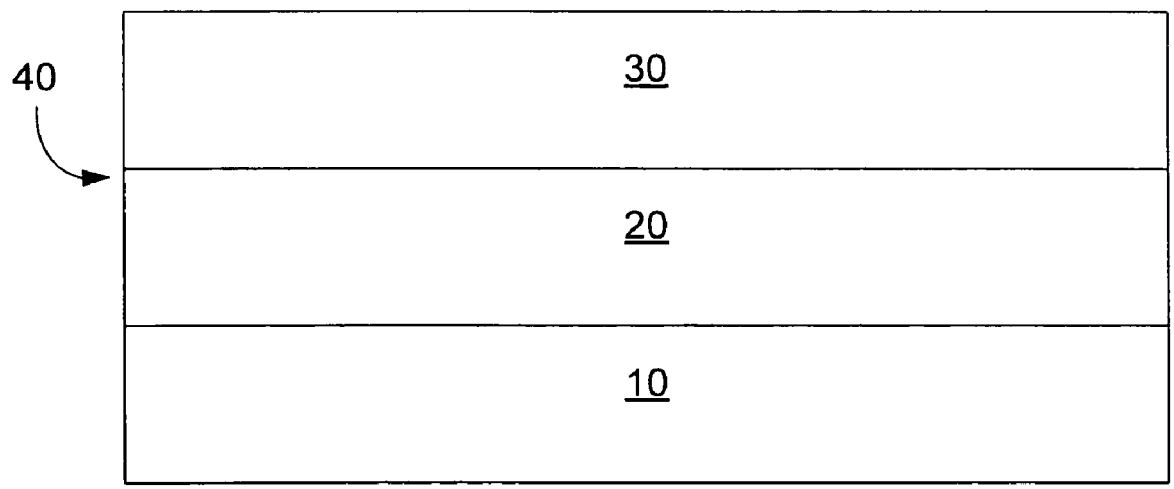
FIG. 2 illustrates a schematic cross-sectional view of the high-refractive index layer of FIG. 1 coated with a low-refractive index layer to form an anti-reflective coating in accordance with an aspect of the invention.

FIG. 2 illustrates that the high refractive index layer 20 may be used in conjunction with second layer 30, such as a polymer layer or an inorganic sputtered material, to form the anti-reflective coating 40. The second layer 30 can be provided over the high-refractive index layer 20 by, for example, gravure coating, dip coating, or spin coating, so that the second layer 30 forms an outer layer and the high refractive index layer 20 forms an inner layer that is at least partially interposed between outer layer and the substrate.

The second layer (or outer layer) 30 has a refractive index that is lower than the refractive index of the high refractive index layer 20 and, preferably, substantially lower than a refractive index of about 1.64 at a wavelength of about 680. The difference between the refractive index of the outer layer 30 and the inner high refractive index layer 20 will impact performance of the anti-reflective coating 40. The higher the refractive index of the inner layer 30, the broader the range of suitable materials that can be used as the outer material. In any anti-reflective design, the outer layer 30 must exhibit a lower refractive index than the inner high refractive index layer 20. Presently, the only low refractive index layers 20 available to designers have poor durability, abrasion and solvent resistance. By effectively increasing the upper limit of the inner high refractive index layer 30, the present invention provides a means for using polymers/ coatings that have moderate refractive indices as the outer layer 30 and result in anti-reflective coatings 40 that exhibit low reflectance but have high durability, scratch, and solvent resistance.

In an aspect of the invention, the outer layer 30 can comprise a UV curable fluorinated acrylate polymer or a fluorinated polymer layer (e.g., Teflon AF®, Cytop® or Certonal®), that dries by evaporation and leaves behind a low refractive index layer of suitable thickness for the desired performance. For example, the thickness of the outer layer 30 can be about 40 nm to about 130 nm. However, due to the high-refractive index of the high-refractive index layer 20, one skilled in the art can utilize purely aliphatic (meth) acrylate cross-linkable oligomers to give very durable low cost anti-reflective coatings. Preferably, the outer layer 30 is composed of commercially available UV curable materials such that the best combination of production efficiency and performance can be readily achieved.

It will be appreciate by one skilled in the art that other polymers, such as a cross linked thermally curable silicone based coating composition (e.g., SDC Silvue® 100 or 200 or other equivalent products coated at a thickness between 40 nm and 130 nm) as well as sputtered or evaporated materials (e.g., sputtered or evaporated silicon dioxide coated with a thickness of about 40 run to about 120 nm) can be used to form the outer layer 30.

The following examples are included to demonstrate various aspects of the invention. Those of skill in the art should, in light of the present disclosure, appreciate that many changes can be made in the specific aspects which are disclosed and still obtain a like or similar result without departing from the spirit and scope of the invention.

EXAMPLES

Example 1

Preparation of High Refractive Index Polyelectrolyte

To a 150 ml reaction vessel, 4.25 grams of dried o-tolidine (OTOL) were added with 50 grams dimethyl formamide (DMF) with stirring. Agitation was continued until dissolution of the 0-tolidine was complete. When the reaction vessel reached a temperature of approximately 65° C., 5.87 grams of dry biphenyltetracarboxylic anhydride (BPDA) were added and washed into the reaction vessel with about 5 to 10 grams of DMF. The reactions was stirred for another 10 to 45 minutes, depending upon the degree of imidization required for the application, poured into a storage vessel and stored.

From this poly-(amic)acid solution, several thin flexible films were cast and dried overnight at room temperature and dried for 30 to 60 minutes at 100° C. to drive off any residual DMF. When the drying step was completed, the reflectivity, transmission and characteristic absorbance of these films was measured. From these data, the refractive index and other optical parameters were calculated and used for subsequent thin film design calculations.

Example 2

Preparation of Organic-inorganic High Refractive Index (HIT-30M) Composite

Approximately 88.60 grams of the high refractive index poly-amic acid dissolved in DMF (12.64 grams of polymer solids) was added to a 1-gallon container and allowed to cool to room temperature. When the polymer (BPDA-co-OTOL) solution was cooled to room temperature, another 1000 grams of DMF were added directly on top of the aforementioned viscous polymer, without stirring. This addition was followed immediately by an addition of 57.00 grams of SunColloid® HIT-30M (at 30 wt % solids in methanol) from Nissan Chemical in 200 grams of DMF. After allowing several minutes for complete dispersion, the poly-amic acid and inorganic oxide composite was mixed thoroughly to prepare an inorganic-organic composite that was composed of 42.36 wt % polymer carrier and 57.64 wt % inorganic oxide property modifiers. This was subsequently diluted to 2.60 wt % solids with DMF to prepare a coating with high refractive index.

Example 3

Preparation of Electro-conductive High Refractive Index Coating

To 51.58 grams of a previously prepared BPDA-co-OTOL polymer solution (19.35 wt % polymer solids) that had been allowed to cool to room temperature, a dilution of 6 parts DMF to 1 part of the polymer solution was performed, with no stirring during the addition. This admixture formed essentially two layers, the polymer solution on the bottom and the DMF on top with little to no intermixing. As quickly as possible, 19.12 grams of Celnax Cx-Z653-F (60 wt % solids in methanol) were added and slowly with the DMF while the polymer was allowed to slowly dissolve into the Celnax-DMF solution. A thin film of this polymeric composite was prepared, dried and the thin film analyzed. A clear very shiny film resulted. In addition, this polymer film exhibited excellent resistance to buildup of static charge with a measured surface resistivity less than $10^7$ Ohms per square.

Example 4

Preparation of SunColloid® AMT-130S BPDA-co-OTOL High Refractive Index Coating

Approximately 20.00 grams of DMF were added to 4.48 grams of high refractive index polymer (16.67 wt % solids). To this solution, 2.50 grams of SunColloid AMT-130S in Methanol (30 wt % solids) were added. This solution was stirred and several pieces of PET film were coated, clear very shiny coatings resulted that exhibited the properties listed in Table 1 resulted.

Example 5

Preparation of IR Blocking Coating Composition

To a previously weighed 100 ml beaker 7.08 grams of OTOL were added followed by 48.30 grams dimethyl formamide. This was stirred at room temperature until the OTOL has completely dissolved. Once dissolution was complete, 9.38 grams of BPDA were added followed by 18.60 grams of DMF. This reaction mixture was allowed to stand at room temperature until a uniform high viscosity polymer solution resulted.

10.00 grams of the poly (amic) acid solution at 19.56 wt % solids was added slowly to a stirred vessel containing 20.00 grams Celnax Cx-653M-F, 8.00 grams DMF and 5.00 grams cyclohexanone. This solution, when completely blended, formed a coating solution at 18.50 wt % solids. These solids were comprised of 24.5-wt % poly (amic) acid and 75.5 wt % Celnax electro-conductive oxide particles.

Figure 3:
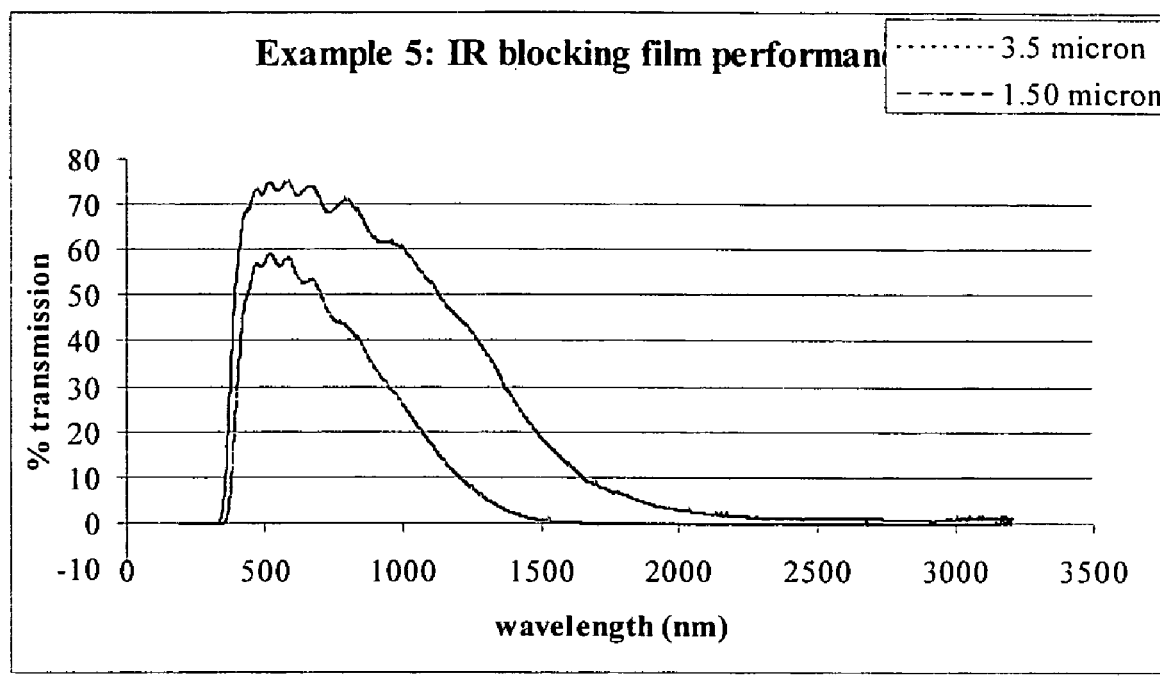
FIG. 3 is a plot illustrating the infrared blocking film performance for a 3.5 micron film and a 1.5 micron film in accordance with an aspect of the invention.

This coating solution was applied to PET film using a Steelial Construction laboratory coater equipped with IR heaters and UV curing lamps at a dry film thickness of 3.50 microns. At this thickness, the visible light transmission measured greater than 60.0 percent, haze was less than 2.00 percent and the resulting cured film allowed less than 20 percent of infrared wavelengths to pass through the film (FIG. 3).

Example 6

Preparation of Anti-Reflective Film

Optical grade PET was coated with a high index layer comprised of 58.00 wt % HIT-30M and 42.00 wt % of the high index polymer described in example 1. The weight percent solids, solvent composition, surface energy of the coating and the relative speed of coating were controlled such that a coating with a dried thickness of 80 nm was obtained after adequate drying with IR heating. Directly on top of this layer a UV curable coating was coated such that a cured film thickness of between 90 and 100 nm was obtained. The measured reflectance of the cured film (FIG. 4) was about 1.25 percent reflectance per side, as compared to 'normal' PET, which has a surface reflectance of about 5.00 percent per side. The physical properties of this AR film sample were excellent, that is, the durability was high, the adhesion was good and the haze levels in the cured film were essentially the same as non-AR-coated PET film.

Figure 4:
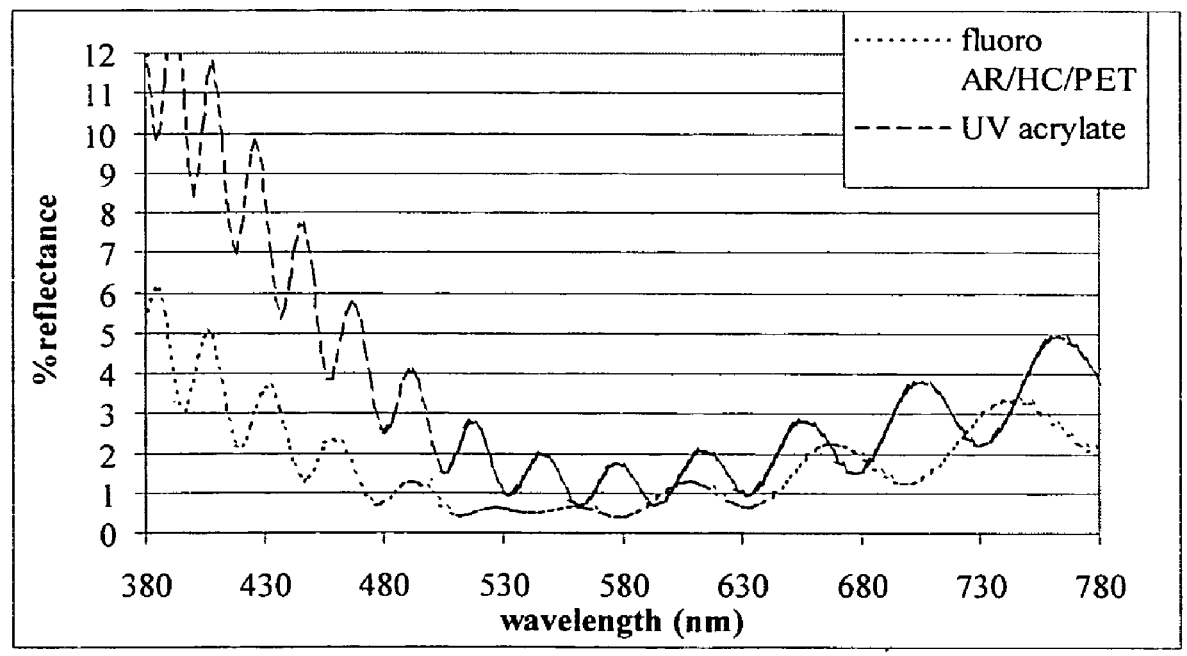
FIG. 4 is a plot illustrating the representative performance of an anti-reflective film in accordance with an aspect of the invention.

A UV curable coating was prepared that contained 25.00 wt % colloidal silicon dioxide. This coating was applied to 3-mil Mitsubishi 4507 optical grade PET film using a number 200 micro-gravure coating head from Yasui Seiki. The coating, as applied, was at 50 wt % solids in blend of isopropyl alcohol and n-propyl alcohol. Using the coating conditions described, a coating thickness of 1.25 microns was obtained for the first layer in the optical interference stack. Directly on this coating, the high refractive index coating detailed in Example 1 was applied using a number 180 MG roll at 3.74 wt % solids. These conditions resulted in a cured coating thickness of about 80 nm, or about ¼λ with λ$_o$ being 550 nm. A UV curable topcoat was applied using a number 180 MG roll, at 3.55 wt % solids in a blend of n-propyl alcohol and methanol. These specific conditions resulted in a cured coating with a thickness of about 100 nm and an AR coating with a minimum reflectance of about 0.60 percent reflectance at 565 nm (FIG. 4). When cured, this AR assembly exhibited resistance to light rubs with steel wool, excellent solvent resistance and excellent dry rub resistance.

The following Table 1 lists performance values for various anti-reflective coatings in accordance with the present invention. The performance values include the minimum reflectance (% R min), abrasion resistance, pencil hardness, and solvent resistance The abrasion resistance was measured by visual inspection of the coating following light rubs with steel wool. The various anti-reflective coatings were formed from compositions comprising the high refractive index polymer of example 1 and various colloidal oxides, similar to the method described in Example 2. The outer layers for the anti-reflective coating comprises various polymers layers, such as UV acrylates and fluoropolymers.

The following Table 2 lists various refractive indices for high refractive index layers in accordance with the present invention. The high refractive index layers include polymeric layers and composite layers (or ceramer layers) formed, respectively, from polyamic acid and polyamic acids with colloidal oxides.

TABLE 1

Performance and Evaluation of AR film from various coatings

| Oxide Type | Oxide Percent | Outer Layer | % R min | Abrasion resistance (#0000) | Pencil Hardness | |
|---|---|---|---|---|---|---|
| HIT-30M | 55.0 | UV acrylate | 1.00 | Excellent | >3H | Excellent |
| HIT-30M | 38.0 | UV acrylate | 0.83 | Excellent | >3H | Excellent |
| AMT-130 | 50.0 | — | NA | NA | NA | NA |
| Hx-300M1 | 75.0 | — | NA | NA | NA | NA |
| Hx-305M1 | 75.0 | UV acrylate | 0.85 | Excellent | >3H | Excellent |
| Hx-305M1 | 75.0 | Fluoropolymer | 0.25 | Poor | NA | Poor |
| Celnax | 62.0 | UV acrylate | 1.10 | Good | NA | Good |
| None | 0.00 | UV acrylate | — | Good | >2H | Excellent |
| Hx-305M1 | 75.0 | Graded index | 0.45 | Excellent | >2H | Excellent |

TABLE 2

Representative Properties of Organo-Nano-composite Ceramers

| Sample | Wt % PAA | Colloidal Oxide | Wt % Oxide | Refractive index (calc) |
|---|---|---|---|---|
| 1 | 100 | — | 0.00 | 1.7289 |
| 2 | 42.36 | HIT-30M | 57.70 | 1.7529 |
| 3 | 42.89 | Cx-Z653M-F | 57.11 | 1.7549 |
| 4 | 50.00 | AMT-130S | 50.00 | 1.6992 |
| 5 | 38.00 | HIT-30M | 62.00 | 1.7600 |
| 6 | 25.00 | Hx-300M1 | 75.00 | 1.7776 |
| 7 | 75.00 | Hx-305M1 | 25.00 | 1.7840 |

Advantages of the present invention should now be apparent. The present invention provides high refractive index polymers, such as polyamic acids and polyamic acid derivatives, that can be used alone or in combination with colloidal particles for forming high-refractive index polymeric or ceramer layers. The high-refractive index polymers in accordance with the present invention can act to coat the colloidal particles thereby providing a uniform surface charge on the collodial particles that prevents the colloidal particles from aggregating and forming larger light scattering agglomerates. The high refractive index polymers in accordance with the present invention will thus have broad application in the field of nano-particle oxide dispersion.

Additionally, these high-refractive index polymers are soluble in common inexpensive industrial solvents; thus, making it more economical to use in forming high-refractive index layers for anti-reflective coatings. These polymers are readily converted into high glass transition insoluble materials via application of energy, be it heat, infrared, UV or by chemical imidization. Since it is possible to convert the high refractive index polymers in accordance with the present invention into polyimide nano-composites at low temperatures by UV or chemical techniques, anti-reflective coatings can be produced at high production rates on large area substrates in contrast to conventional wet or vacuum anti-reflective processes. Furthermore, as a result of the chemistry of this particular technique, the refractive index of the disclosed invention can be varied by adding diamine or dianhydride monomers that contain bromine, sulfur, fluorine or similar elements, depending on the refractive index required by a particular application.

From the above description of the invention, those skilled in the art will appreciate improvements, changes, and modifications. Such improvements, changes and modifications can incude are intended to be covered by the appended claims. For example, those skilled the art would appreciate the anti-reflective coating can comprise a plurality of alternating low-refractive index layers and high-refractive index layers formed over a substrate.

What is claimed is:

1. A composition for forming a layer on a substrate, the composition comprising:
   a polyelectrolyte soluble in a polar solvent, the polyelectrolyte including a plurality of aromatic groups and nitrogen atoms in a main polymer chain, all the aromatic groups in the main polymer chain being arranged in a coplanar manner, the polyelectrolyte having a refractive index of at least about 1.64 at a wavelength of about 680 nm;
   a solvent that facilitates solvation of the polymer; and
   a plurality of uniformly dispersed colloidal particles.

2. The composition of claim 1, the polyelectrolyte including at least one of a polyamic acid, a polyamic acid ester or a polyamic acid salt, the at least one polyamic acid, a polyamic acid ester or a polyamic acid salt having a refractive index of at least about 1.64 at a wavelength of about 680 nm.

3. The composition of claim 2, forming a uniform layer when applied on the substrate.

4. The composition of claim 2, the polyamic acid, polyamic acid ester, or polyamic acid salt being at least partially condensed to form imide rings within a main chain of the polyamic acid, polyamic acid ester, or polyamic acid salt.

5. The composition of claim 2, the polyamic acid, polyamic acid ester or polyamic acid salt comprising at least one o-tolidine or o-tolidine-based diamine.

6. The composition of claim 1, the colloidal particles comprising at least one of a colloidal metal oxide or colloidal inorganic oxide selected from the group consisting of silicon oxides, aluminum oxides, titanium oxides, zinc oxides, germanium oxides, indium oxides, tin oxides, zirconium oxides, and antimony oxides.

7. The composition of claim 6, the colloidal particles comprising about 40 weight percent to 80 weight percent of the composition's solids.

8. The composition of claim 6 the colloidal metal oxide particles or colloidal inorganic oxide particles comprising a colloidal metal oxide sol or colloidal inorganic oxide sol.

9. The composition of claim 1, the solvent comprising at least one of dimethyl formamide, dimethyl acetamide, cyclohexanone, methyl ethyl ketone, or combinations thereof.

10. The composition of claim 1, further comprising a flow control additive.

11. An anti-reflective film comprising:
    a high-refractive index layer having a refractive index of at least about 1.70 at a wavelength of about 680 nm, the high-refractive index layer including:
    a polyelectrolyte comprising a plurality of aromatic groups and nitrogen atoms in a main polymer chain, all the aromatic groups in the main polymer chain being arranged in a coplanar manner, the polyelectrolyte having a refractive index of at least about 1.64 at a wavelength of about 680 nm; and
    a plurality of uniformly dispersed colloidal particles having an average particle diameter less than about 100 nm.

12. The film of claim 11, the polyelectrolyte comprising at least one of a polyamic acid, polyamic acid ester, or polyamic acid salt that has been at least partially cured to form imide rings within a main chain of the polyelectrolyte.

13. The film of claim 12, the polyamic acid, polyamic acid ester or polyamic acid salt further comprising at least one o-tolidine or o-tolidine-based diamine.

14. The film of claim 11, the colloidal particles comprising at least one of a colloidal metal oxide or colloidal inorganic oxide selected from the group consisting of silicon oxides, aluminum oxides, titanium oxides, zinc oxides, germanium oxides, indium oxides, tin oxides zirconium oxides, and antimony oxides.

15. The film of claim 11, further comprising a low-refractive index layer having refractive index less than about 1.64 at a wavelength of about 680 nm.

16. The film of claim 15, the high-refractive index layer having a thickness of about 5 nm to about 200 nm and the low-refractive index layer have a thickness of about 40 nm to about 130 nm.

17. The film of claim 15, the low-refractive index layer comprising at least one of silicon dioxide, a resin composition, fluorinated polymer, or a silicone based composition.

18. The film of claim 16 being provided on a substrate, the high-refractive index layer being at least partially interdisposed between the low-refractive index layer and the substrate.

19. The film of claim 18, the substrate comprising a transparent material.

20. The film of claim 19, the substrate being selected from the group consisting of triacetylcellulose, PET, polycarbonate and PMMA resins.

21. A composition for forming a polymeric layer comprising:
    a polyelectrolyte soluble in a polar solvent, the polyelectrolyte including a plurality of aromatic groups and nitrogen atoms in a main polymer chain, all the aromatic groups in the main polymer chain being arranged in a coplanar manner, the polyelectrolyte having a refractive index of at least about 1.64 at 680 nm; and
    a plurality of uniformly dispersed colloidal oxide particles having an average particle diameter less than about 100 nm, the colloidal oxide particles being selected from the group consisting of aluminum oxides, germanium oxides, indium oxides, tin oxides, zirconium oxides, and combinations thereof.

22. An anti-reflective film comprising:
    a high-refractive index layer having a refractive index of at least about 1.70 at a wavelength of about 680 nm, the high-refractive index layer including:
    a polyelectrolyte comprising a plurality of aromatic groups and nitrogen atoms in a main polymer chain, all the aromatic groups in the main polymer chain being arranged in a coplanar manner, the polyelectrolyte having a refractive index of at least about 1.64 at a wavelength of about 680 nm; and a plurality of uniformly dispersed colloidal particles having an average particle diameter less than about 100 nm, the colloidal oxide particles being selected from the group consisting of aluminum oxides, germanium oxides, indium oxides, tin oxides, zirconium oxides, and combinations thereof.

* * * * *